(No Model.)

E. G. W. BARTLETT.
REVERSIBLE FILTER.

No. 333,498.  Patented Jan. 5, 1886.

Attests:
John G. Hinkel Jr.
Wm. F. Sayers

E. G. W. Bartlett
Inventor
Foster & Freeman
attys.

UNITED STATES PATENT OFFICE.

ELBRIDGE G. W. BARTLETT, OF YONKERS, NEW YORK.

REVERSIBLE FILTER.

SPECIFICATION forming part of Letters Patent No. 333,498, dated January 5, 1886.

Application filed May 18, 1885. Serial No. 165,877. (No model.)

*To all whom it may concern:*

Be it known that I, ELBRIDGE G. W. BARTLETT, a citizen of the United States, and a resident of Yonkers, in the county of Westchester and State of New York, have invented certain new and useful Improvements in Reversible Filters, of which the following is a specification.

My invention is an improvement in reversible filters; and it consists in providing a filter of this class with an adjustable and removable valve attachment capable of being inserted into the filter from either end, and so arranged that the water or other liquid flowing into the filter may readily be made to pass through the filtering medium, to be cleansed of its impurities, or by a slight adjustment of the valve the liquid will escape through a central opening in an unfiltered condition, all as fully set forth hereinafter.

Figure 1:
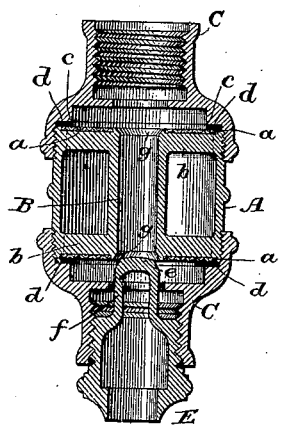
Figure 2:
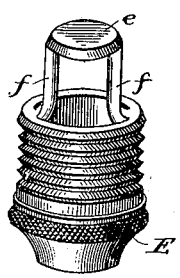
Figure 3:
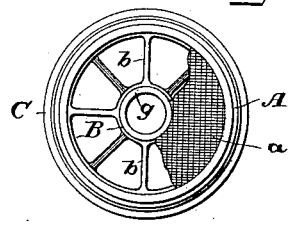

In the drawings, Figure 1 is a central vertical section of a filter embodying my invention. Fig. 2 is a detached perspective view of the valve, and Fig. 3 is a plan view of the body of the filter with the upper portion removed and the filtering-disk partly broken away.

A is the body or outer casing of the filter, which may be of any desired form, that preferred, however, being cylindrical, as shown, and provided with an inner concentric tube, B, supported within the outer casing by arms *b*. This central tube, B, may be cast in one with the outer casing, or it may be a separate piece supported therein in any well-known manner.
The body or casing A is screw-threaded at or near each end, to receive a correspondingly-threaded cap, C, screwed thereon, so that the parts may be firmly secured together, and each cap is provided with an internal shoulder, *c*, near its enlarged end, where it is screwed to the body of the filter, while its opposite end is contracted and provided with an internal thread, by which the filter is connected with the supply cock or faucet.
The filtering medium consists of perforated metal or wire-gauze disks *a*, held against the arms *b* by the shoulders *c* of the end caps; and suitable packing-rings, *d*, are interposed between the disks and said shoulders, to firmly clamp the disks in place, and at the same time prevent leaking at the points where the caps B are screwed to the body of the filter. Each disk *a* is provided with a large central opening, through which passes the end of the tube B, slightly extended beyond the arms *b*, as shown in Fig. 1.

To insure the passage of the liquid through the filtering-disks when this is desired, and at the same time adapt the filter for allowing a free flow of unfiltered liquid through it, I employ a tubular mouth-piece, E, externally threaded and fitting into the contracted end of the cap C, and provided with arms *f*, carrying a valve, *e*, adapted to a seat, *g*, in the end of the central tube, B. By this construction it will be seen that by screwing the mouth-piece E into the filter the valve *e* will be brought against its seat, thus closing the central passage and compelling the inflowing liquid to pass through the filtering-disks to the discharge-opening at the opposite end, while by reversing the adjustment of the valve the liquid will pass freely through the central opening around the valve *e* and supporting-arms to the discharge.

When it is desired to reverse the filter to remove the sediment which has collected upon the filtering-disk at the inflowing end, the mouth-piece E will be removed and screwed into the opposite end of the filter after disconnecting the latter from the supply-cock, and the position of the filter may then be reversed and connection with the supply again established, as before.

From the foregoing description it will be seen that while my improved filter is simple and cheap of construction it is at the same time very effective for the purpose intended, and is so arranged that the parts may be readily detached, to facilitate removing the sediment or making repairs.

If desired, any suitable filtering material—such as sponge, powdered charcoal, sand, or quartz—may be filled in between the perforated disks, as usual.

Without limiting myself to the precise construction and arrangement of parts shown and described, I claim—

1. A reversible filter provided with a filtering medium, a central passage, and a longitudinally-adjustable mouth-piece carrying a valve adapted to a seat in said passage, substantially as set forth.

2. A reversible filter provided at opposite ends with filtering-disks, and having a central tube or passage through said disks and the body of the filter, and a removable adjustable mouth-piece carrying a valve adapted to a seat in said central passage, substantially as set forth.

3. A reversible filter provided with a central tube supported therein and having valve-seats at its opposite extremities, and a filtering-disk at each end of said tube and surrounding the latter, and a removable adjustable mouth-piece adapted to either end of the filter and carrying a valve adapted to said seats, substantially as and for the purpose set forth.

4. A reversible filter composed of the body A, provided with a central tube supported therein by arms $b$, internally-shouldered caps C C, screwing onto the ends of said body, filtering-disks surrounding the central tube at opposite ends and interposed between said arms and shoulders, and a longitudinally-adjustable and removable mouth-piece carrying a valve adapted to a seat at either end of said tube, substantially as and for the purpose set forth.

In testimony whereof I have signed my name to this specification in the presence of two subscribing witnesses.

ELBRIDGE G. W. BARTLETT.

Witnesses:
E. R. KEYES,
JOHN W. ALEXANDER.